United States Patent Office 3,694,323
Patented Sept. 26, 1972

3,694,323
SEPARATION OF DISTILLABLE ISOCYANATES FROM THEIR PHOSGENATION MASSES
John Richard Cooper, Hockessin, and Gilbert Thornton Perkins, Landenberg, Del., assignors to E. I. du Pont de Nemours and Company, Wilmington, Del.
No Drawing. Filed Aug. 5, 1968, Ser. No. 749,930
Int. Cl. B01d 3/34; C07c 119/04
U.S. Cl. 203—60          12 Claims

ABSTRACT OF THE DISCLOSURE

Process for recovering an isocyanate in high yield from its phosgenation mass while fluidizing the distillation residue comprising distilling said isocyanate in the presence of an isocyanate exchange agent.

BACKGROUND OF THE INVENTION

It is well known to prepare organic isocyanates by reacting the corresponding amine with phosgene in the presence of an inert solvent. The crude product (phosgenation mass) thus obtained contains the desired isocyanate in addition to various tarry phosgenation by-products of a complex nature from which the desired isocyanate is recovered by distillation.

The recovery of isocyanates from their phosgenation mass is complicated because of the nature of the residues which are concentrated as the distillation nears completion. These residues become hard and intractable and are removed from the distillation equipment only with great difficulty unless a significant portion of the desired isocyanate is allowed to remain in the residue. In addition, such residues contain an amount of isocyanate which is chemically bound in complex compounds from which the isocyanate can be liberated only by prolonged heating.

Many methods have been proposed for efficiently increasing the recovery of isocyanates and avoiding the residue handling problems. These include distillation in special types of equipment, distillation in the presence of high boiling plasticizing solvents, removal of the residues by precipitation prior to distillation and distillation in the presence of high boiling liquids in which the residues are immiscible. None of these methods has been entirely satisfactory for reasons such as high equipment and operating costs, handling problems associated with the modified residue resulting from the recovery process and limited recoveries of the total isocyanate available.

U.S. Pat. 3,163,666 discloses a process for preparing and isolating 4,4'-methylenebis(phenyl isocyanate) (MDI) which comprises the steps of condensing aniline with formaldehyde to prepare a crude 4,4'-methylenedianiline (MDA), phosgenating the crude MDA to prepare the corresponding crude phosgenation mass which contains the desired MDI in addition to higher methylene-bridged polyarylene polyisocyanates and phosgenation by-products, and finally recovering MDI directly from this phosgenation mass by distillation. The teachings of this patent, though effective in the recovery of MDI, do not suggest how other important isocyanates such as the tolylene diisocyanates, phenylene diisocyanates and 4,4'-methylenebis(cyclohexyl isocyanate) can be effectively separated from their phosgenation masses.

There continues to be a need, therefore, for a process to recover isocyanates in high yield from their phosgenation mass while leaving the undistilled residue in an easily handled form that can readily be removed from the distillation equipment.

SUMMARY OF THE INVENTION

This invention provides a process for isolating a distillable organic isocyanate by distillation in high yield from its phosgenation mass which comprises essentially carrying out the distillation in the presence of an effective amount of an isocyanate exchange agent. The residue remaining after distillation is rendered mobile by the exchange agent and is readily removed from the distillation equipment.

DETAILED DESCRIPTION

The term "distillable organic isocyanate" means any organic isocyanate which can be removed from its phosgenation mass by distillation, usually at reduced pressure. The term "phosgenation mass" as used herein means any crude product, resulting from phosgenation of an organic amine, which contains a distillable organic isocyanate in addition to phosgenation by-products and other impurities. The term "initial phosgenation mass" means the original substantially unaltered crude product resulting from phosgenation of an organic amine. The term "isocyanate exchange agent" means any organic isocyanate which when present in a phosgenation mass as defined above, boils at a temperature sufficiently higher than said "distillable organic isocyanate" that the isocyanate exchange agent and distillable organic isocyanate have a relative volatility of at least 2 under the conditions of distillation.

Relative volatility is defined as $$\frac{V_a h_b}{V_b h_a}$$

where $V_a$ and $V_b$ are the mole fractions of components $a$ and $b$ ($a$ being the more volatile component) in the vapor phase and $h_a$ and $h_b$ are the mole fractions of $a$ and $b$ in the liquid phase at equilibrium at a specified temperature. Relative volatility is the most important factor in determining ease of separation of materials by distillation. The values of $V_a$, $h_a$, $V_b$ and $h_b$ can readily be determined in apparatus such as an Othmer still by methods well known in the art; see, e.g., Ind. and Eng. Chem., vol. 20, p. 743, 1928. Estimated relative volatilities can also be obtained by the above formula based on the vapor pressures of the two components, assuming perfect behavior of the system.

The process of this invention is useful in the recovery of distillable organic isocyanates or mixtures thereof from their phosgenation masses. While the process aids in the isolation of mono-, di- and higher polyisocyanates, best results are achieved in the recovery of diisocyanates such as the tolylene diisocyanates. Representative organic isocyanates include the following:

(A) Aromatic isocyanates containing 1 benzene nucleus such as phenyl isocyanate, o-, m- and p-tolyl isocyanates, 4-bromophenyl isocyanate, 2,5-dichlorophenyl isocyanate, p-dodecylphenyl isocyanate, p-methoxyphenyl isocyanate, 1,3- and 1,4-phenylene diisocyanates, 2,4- and 2,6-tolylene diisocyanate (TDI), xylyl diisocyanates, 2-chloro-1,4-phenylene diisocyanates and 2,4,6-toluene triisocyanate.

(B) Aromatic isocyanates containing 2 or more condensed or uncondensed benzene nuclei such as 1- and 2-naphthyl isocyanates, 4-biphenylyl isocyanate, 4,4'-oxybis(phenyl isocyanate), benzidine diisocyanate, 4,4'-methylenebis(2-chlorophenyl isocyanate), 4,4'-methylenebis(2-tolyl isocyanate), 1,5- and 1,8-naphthylene diisocyanates, 1,4-anthrylene diisocyanate, 4,4',4'',-methylidynetris(phenyl isocyanate), 2,4,4'-triisocyanatodiphenyl ether and 3 - (p - isocyanatobenzyl)-4,4'-diisocyanatodiphenylmethane.

(C) Aliphatic isocyanates such as n-hexyl isocyanate, n-dodecyl isocyanate, 1,4-tetramethylene diisocyanate, 1,6-hexamethylene diisocyanate and 1,11-undecamethylene diisocyanate. Aliphatic isocyanates derived from inert radicals other than hydrocarbon radicals are also included as long as the isocyanato groups are connected to aliphatic carbons as in 2,2′-diisocyanatodiethyl carbonate for example.

(D) Cycloaliphatic isocyanates such as cyclohexyl isocyanate, 1,3 and 1,4-cyclohexylene diisocyanates, 4-methyl-1,3-cyclohexylene diisocyanate and 4,4′- and 2,4′-methylenebis(cyclohexyl isocyanate).

(E) Heterocyclic isocyanates such as furfuryl isocyanate, tetrahydrofurfuryl isocyanate and furfurylidene diisocyanate.

Any of the isocyanates hereinbefore described can be used as the isocyanate exchange agent to improve the recovery of a second isocyanate so long as the isocyanate used as the exchange agent is sufficiently high boiling that it and the second (distillable) isocyanate with which it is used have a relative volatility of at least 2. Separation is best achieved when the distillable isocyanate and isocyanate exchange agent have a relative volatility of at least about 20. Polyarylene polyisocyanates such as 4,4′-methylenebis(phenyl isocyanate) (MDI) and related higher functional materials are preferred exchange agents because of their availability and high boiling point. (Estimated boiling points at 10 mm. Hg for TDI, MDI and phosgenated MDA still tar are 120° C., 205° C., and 300° C., respectively.) The preparation of representative methylene-bridged polyarylene polyisocyanates of this type is described in U.S. 2,683,730 to Seeger et al. Particularly preferred exchange agents are the methylene-bridged polyarylene polyisocyanates having a functionality (isocyanato groups per molecule) greater than two. These preferred compositions are prepared by (1) condensing aniline with formaldehyde, phosgenating the resulting mixture and removing all or substantially all of the MDI by distillation, or (2) following the same process except 4,4′-methylenedianiline is removed from the aniline-formaldehyde condensation product prior to phosgenation; the latter process being preferred. The mole ratios of aniline to formaldehyde used are about 1.1–10:1, and preferably about 1.5–4.0:1. Such polyisocyanate compositions are well known in the art and are designated herein as "phosgenated MDA still tar." The preparation of MDA still tar is described in column 9 of U.S. Pat. 3,317,481. At 205° C. TDI and MDI have an estimated relative volatility of about 23 mile TDI and phosgenated MDA still star (aniline to formaldehyde ratio about 3:1) have an estimated relative volatility of about 2000.

The organic isocyanates which serve as exchange agents and fluidize the distillation residue do not contain substituents which react with isocyanato groups. Thus, in the case of phosgenated MDA still tars, since some of the tarry phosgenation by-products do have active hydrogen atoms, only that portion of the compositions which are methylene-bridged polyaryl polyisocyanates are isocyanate exchange agents within the meaning of this invention.

The instant process can be used for the recovery of isocyanates prepared by conventional phosgenation processes such as those described in U.S. Pats. 2,822,373, 2,680,127 and 2,908,703.

In carrying out the process of this invention, the isocyanate exchange agent can be added at any point in the isolation of the desired isocyanate following phosgenation. The exchange agent can thus be added before, after or during separation of the solvent from the phosgenation mass. It can also be added after removal of a portion of the distillable isocyanate. Alternatively, the amine corresponding to the isocyanate exchange agent can be mixed with the parent amine of the distillable isocyanate and the resulting mixture phosgenated, followed by distillation. A particularly useful commercial process involves phosgenating a mixture of m-tolylene diamines, MDA and MDA still star and recovering distilled TDI in high yield. The resulting fluid crude polyisocyanate residue produced by this process is useful in the preparation of rigid polyurethane foams and other applications.

The quantity of isocyanate exchange agent to be used will vary with the desired yield of distilled isocyanate and desired fluidity of the undistilled residue. The required quantity in any situation is readily determined by measuring the recovery by distillation of the desired isocyanate in the presence of increasing amounts of the exchange agent, and observing the behavior of the undistilled residue (see Example 3 hereinafter). Ordinarily, about 1 mole of isocyanate exchange agent is required to displace 1 mole of the desired isocyanate. In the case of tolylene diisocyanate being displaced by the preferred exchange agent, phosgenated MDA still tar, an increase in recovery of about 1 part of tolylene diisocyanate is realized for each 3 parts of exchange agent added, until the recovery of TDI approaches the maximum available. In general, for isocyanates such as tolylene diisocyanates, phenylene diisocyanates, and 4,4′-methylenebis(cyclohexyl isocyanate) about 5 to 20 parts of most exchange agents per 100 parts of solvent-free initial phosgenation mass will significantly increase the recovery of the desired isocyanate and at the same time adequately fluidize the residue remaining after recovery of the desired isocyanate by distillation. The meaning of the term "effective amount" as used herein can therefore easily be determined by one skilled in the art in view of the guidelines given above.

The instant process can be carried out in batch or continuous conventional vacuum stills according to methods used in conventional distillation of isocyanates. Evaporating equipment in which the exposure of the process stream to high temperatures is minimized is especially preferred. Representative examples of such equipment include falling film evaporators as described in U.S. Pat. 3,188,241 to Baird, climbing film evaporators as described in British Pat. 835,645 and horizontal and vertical wiped film evaporators as described in U.S. Pats. 2,927,634 and 2,955,990 to Gudheim and Smith respectively. Temperatures and hold-up times normally employed for distilling isocyanates in any of these types of equipment are satisfactory for conducting the process.

Since the isocyanate exchange agent inhibits the desired isocyanate from polymerizing and forming complexes with the distillation residue, the process of this invention makes possible the recovery of isocyanates in greater yields than was possible by prior art methods. A further advantage is that the distillation residue is fluidized in the presence of the exchange agents and thus rendered more mobile and remains mobile for longer periods so that it is easier to remove from distillation equipment and dispose of than residues from prior art processes.

The process of this invention will be better understood by reference to the following examples wherein parts and percentages are by weight unless otherwise indicated.

EXAMPLE 1

(A) Solvent-free crude tolylene diisocyanate (TDI) (172.7 parts) obtained by phosgenation of tolylene diamine (80% 2,4-isomer, 20% 2,6-isomer) substantially by the procedure of Example 1 of U.S. 2,822,373 is distilled at a pressure of 10 mm. Hg. The distillation is stopped when the temperature of the still pot reaches 215° C. The distillate amounts to 152.9 parts corresponding to a recovery of 88.5 parts of tolylene diisocyanate per 100 parts of initial crude diisocyanate.

(B) When 159.8 parts of the crude tolylene diisocyanate is mixed with 58.7 parts of concentrated crude 4,4′-methylenebis(phenyl isocyanate) and the mixture is distilled to a final pot temperature of 215° C. at a pressure of 10 mm. Hg, 151.8 parts of distillate, containing about 1% 4,4′-methylenebis(phenyl isocyanate) is obtained.

The concentration of 4,4'-methylenebis(phenyl isocyanate) in the distilled tolylene diisocyanate is estimated by gas chromatography and also calculated from the amine equivalent of the distillate. This corresponds to a recovery of 94 parts of tolylene diisocyanate per 100 parts of the initial crude diisocyanate which is a substantial increase in recovery over the prior art process of part A above.

The concentrated crude 4,4'-methylenebis(phenyl isocyanate) used in this example is obtained by distilling 4,4'-methylenebis(phenyl isocyanate) from a sample of the undistilled 4,4'-methylenebis(phenyl isocyanate) designated as Polyisocyanate B in U.S. 3,317,481 until the content of distillable diisocyanate is reduced to 40%. The estimated relative volatility of TDI to MDI is about 23.

EXAMPLE 2

A mixture of 300 parts of solvent-free crude tolylene diisocyanate (prepared as described in Example 1) containing 264 parts distillable TDI at a final pot temperature of 200° C. at 0.2 mm. Hg, and 100 parts of crude 4,4'-methylenebis(phenyl isocyanate) (prepared substantially by the procedure for Polyisocyanate B in U.S. 3,317,481) containing 78 parts of distillable MDI at a final pot temperature of 250° C. at 0.2 mm. Hg is distilled to a final pot temperature of 250° C. at a pressure of 0.5 mm. Hg. The distillate amounts to 316.6 parts, of which 283.5 parts is tolylene diisocyanate and 33.1 parts is 4,4'-methylenebis(phenyl isocyanate) as determined by gas chromatography. This corresponds to a 7.4% increase in recovery of tolylene diisocyanate from the crude tolylene diisocyanate charged to the still.

EXAMPLE 3

A nonvolatile polyamine is prepared by collecting the steel heel left by distilling all of the 4,4'-methylene-dianiline from the reaction product obtained by condensing aniline and formaldehyde by the procedure given in column 9, U.S. 3,317,481. This polyamine, hereinafter referred to as "MDA still tar," is phosgenated in a series of runs in which it is admixed with varying amounts of 2,4-tolylene-diamine. Conversion of the amine mixtures to the corresponding isocyanates is accomplished substantially by the phosgenation procedure described in Example 1 of U.S. 2,822,373 with the exception that the temperature in the reaction zone and reservoir is 150° C. All runs are made at an amine concentration equivalent to about an 8% solution of 2,4-tolylenediamine, i.e. The solution contains the same concentration of amino groups as an 8% solution of 2,4-tolylenediamine. The products are distilled to recover all of the 2,4-tolylenediisocyanate formed. The results of these experiments (Table 1) show that an increase in 2,4-tolylenediisocyanate yield is obtained in the presence of the substantially nonvolatile isocyanate (estimated relative volatility of TDI to phosgenated MDA still tar is about 2000) resulting from the phosgenation of the MDA still tar.

TABLE 1

| MDA still tar | 2,4-tolylene-diamine, percent | Yield of 2,4-tolylene-diisocyanate, percent |
|---|---|---|
| 0 | 100 | 86.8 |
| 2 | 98 | 88.3 |
| 4 | 96 | 90.0 |
| 8 | 92 | 90.6 |
| 15 | 85 | 92.2 |
| 20 | 80 | 94.5 |
| 22.5 | 77.5 | 92.8 |
| 25 | 75 | 93.1 |
| 29 | 71 | 92.2 |

EXAMPLE 4

A 14.5% by weight solution of tolylene-2,4-diamine in o-dichlorobenzene is phosgenated substantially by the procedure of Example 2 in U.S. 2,822,373 with the exception that the temperature in the reaction zone and reservoir is 110° C. Following the same procedure, a second phosgenation of an amine mixture containing 85% by weight tolylene-2,4-diamine and 15% MDA still tar (described in Example 3) is run. Before phosgenation, the amine mixture is dissolved in sufficient o-dichlorobenzene to produce a solution having an amine concentration equivalent of 14.5% tolylene-2,4-diamine.

Distillation of a portion of the product resulting from the phosgenation of straight tolylene diamine at a pressure of 10 mm. Hg and a final still pot temperature of 170° C. yields 85.8% of theory of tolylene-2,4-diisocyanate. The residue from this distillation solidified in less than 10 minutes after the temperature in the still pot reaches 170° C. Distillation of a portion of the phosgenation product of the amine mixture (also at 10 mm. Hg and a final temperature of 170° C.) yields 88.0% of theory of tolylene-2,4-diisocyanate. In marked contrast to the residue resulting from distillation of straight tolylene diisocyanate, the residue from the phosgenation of the amine mixture is still fluid after 5 hours at 170° C.

Distillation of a second portion of the straight tolylene-2,4-diamine phosgenation mass at 0.5 mm. Hg pressure and a final pot temperature of 200° C. gives a yield of 89.4% of theory of tolylene-2,4-diisocyanate. Distillation of a second portion of the amine mixture phosgenation mass under the same conditions gives a significantly higher yield of 95.2% of theory of tolylene-2,4-diisocyanate.

EXAMPLE 5

An amine mixture containing 75% by weight tolylene-2,4-diamine and 25% by weight of crude 4,4'-methylenedianiline (containing 87% diamine and 13% of related tri- and higher polyamines) is dissolved in o-dichlorobenzene to give a solution having a concentration equivalent of a 14.5% solution of tolylene-2,4-diamine. The solution is phosgenated by the procedure of Example 4.

Distillation of a portion of the product at a pressure of 0.5 mm. Hg to a final still pot temperature of 250° C. gives a 97.8% yield of theory of tolylene-2,4-diisocyanate.

Distillation of a second portion of the phosgenation mass at 0.8 mm. Hg and a final pot temperature of 190° C. gives a 95.3% yield of tolylene-2,4-diisocyanate. The residue from this distillation remains fluid at 190° C. for 2 hours after the temperature first reaches 190° C.

EXAMPLE 6

An amine mixture containing 82% by weight tolylene-2,4-diamine and 18% by weight 4-dodecylaniline is dissolved in o-dichlorobenzene to give a solution having an amine concentration equivalent to a 14.5% solution of tolylene-2,4-diamine. The solution is phosgenated by the procedure of Example 4.

Distillation of a portion of the phosgenation reaction mass at 10 mm. Hg to a final still pot temperature of 200° C. yields 91.4% of theory of tolylene-2,4-diisocyanate. The distillation residue is still fluid after being held at 200° C. for 10 hours.

Distillation of a second portion of phosgenation mass at a pressure of 0.5 mm. Hg to a final pot temperature of 200° C. yields about 95% of theory of tolylene-2,4-diisocyanate. The relative volatility of TDI to 4-dodecylphenylisocyanate is greater than 2.

EXAMPLE 7

An amine mixture containing 90.5% by weight tolylene-2,4-diamine and 9.5% by weight of an aliphatic primary monoamine mixture (10% $C_{18}$ amines, 90% $C_{20}$–$C_{22}$ amines) is dissolved in o-dichlorobenzene to give a solution having an amine concentration equivalent to a 14.5% solution of tolylene-2,4-diamine. The solution is phosgenated by the procedure of Example 4.

Distillation of a portion of the phosgenation mass at a pressure of 0.5 mm. Hg to a final still pot temperature of 180° C. yields 88.0% of theory of tolylene-2,4-diisocyanate. The distillation residue remains fluid for 30 minutes at 180° C.

Distillation of a second portion of phosgenation mass at 0.5 mm. Hg to a final pot temperature of 200° C. yields 91.1% of theory of tolylene-2,4-diisocyanate.

The relative volatility of TDI to the phosgenated aliphatic primary monoamine mixture is greater than 2.

What is claimed is:

1. In a process for isolating a distillable organic isocyanate from the group: aromatic isocyanates containing 1-benzene nucleus, aliphatic isocyanates, cycloaliphatic isocyanates, heterocyclic isocyanates, 1-naphthyl isocyanate, 2-naphthyl isocyanate, 4-biphenyl isocyanate, 4,4'-oxybis(phenyl isocyanate), benzidine diisocyanate, 1,5-naphthylene diisocyanate, 1,8-naphthylene diisocyanate, 1,4 - anthrylene diisocyanate, 4,4',4''' - methylidynetris (phenyl isocyanate), 2,4,4'-triisocyanatodiphenyl ether and 3-(p-isocyanatobenzyl) - 4,4' - diisocyanatodiphenylmethane from its phosgenation mass, the improvement comprising distilling said organic isocyanate in the presence of an effective amount of an organic isocyanate exchange agent, which does not contain substituents which react with isocyanato groups, to increase the yield of distilled isocyanate and fluidize the undistilled residue, said isocyanate exchange agent being any organic isocyanate which when present in a phosgenation mass, boils at a temperature sufficiently higher than said distillable organic isocyanate that the isocyanate exchange agent and distillable organic isocyanate have a relative volatility of at least two under the conditions of distillation.

2. The process of claim 1 wherein the isocyanate exchange agent is prepared by phosgenating the condensation product of aniline and formaldehyde in the presence of a mineral acid, the mole ratio of aniline to formaldehyde being about 1.1–10.0:1.

3. The process of claim 1 wherein the isocyanate exchange agent is phosgenated 4,4'-methylene dianiline still tar.

4. The process of claim 1 wherein the isocyanate exchange agent is 4-dodecylphenyl isocyanate.

5. The process of claim 2 wherein the organic isocyanate is at least one of a tolylene diisocyanate, a phenylene diisocyanate or 4,4' - methylenebis(cyclohexyl isocyanate).

6. The process of claim 5 wherein the isocyanate exchange agent is prepared by phosgenating the condensation product of aniline and formaldehyde in the presence of a mineral acid, the mole ratio of aniline to formaldehyde being about 1.1–10.0:1.

7. The process of claim 5 wherein the isocyanate exchange agent is phosgenated 4,4'-methylene dianiline still tar.

8. The process of claim 5 wherein the isocyanate exchange agent is 4-dodecylphenyl isocyanate.

9. The process of claim 5 wherein the isocyanate exchange agent is present in an amount corresponding to about 5–20 parts by weight per 100 parts of solvent-free initial phosgenation mass.

10. The process of claim 9 wherein the organic isocyanate is at least one tolylene diisocyanate.

11. The process of claim 10 wherein the isocyanate exchange agent is phosgenated MDA still tar.

12. In a process of claim 1 for isolating a distillable organic isocyanate, the improvement consisting essentially of distilling said organic isocyanate in the presence of about 5 to 20 parts of an isocyanate exchange agent per 100 parts of solvent-free initial phosgenation mass, said isocyanate exchange agent and distillable isocyanate having a relative volatility of at least two under the conditions of distillation.

References Cited

UNITED STATES PATENTS

| | | | |
|---|---|---|---|
| 2,680,128 | 6/1954 | Slocombe et al. | 260—453 |
| 2,884,360 | 4/1959 | Bloom et al. | 260—453 X |
| 2,884,361 | 4/1959 | Bloom et al. | 260—453 X |
| 2,884,362 | 4/1959 | Bloom et al. | 260—453 X |
| 2,884,363 | 4/1959 | Bloom et al. | 260—453 X |
| 3,169,141 | 2/1965 | Kober et al. | 260—453 X |
| 3,488,374 | 1/1970 | Kober et al. | 260—453 |

OTHER REFERENCES

Netherlands Patent Publication, No. 67:08349, December 1967.

Japanese Patent Publication, No. 6777/68, March 1968.

JOSEPH REBOLD, Primary Examiner

D. H. TORRENCE, Assistant Examiner

U.S. Cl. X.R.

203—6, 8; 260—453 PH, 453 SP